UNITED STATES PATENT OFFICE.

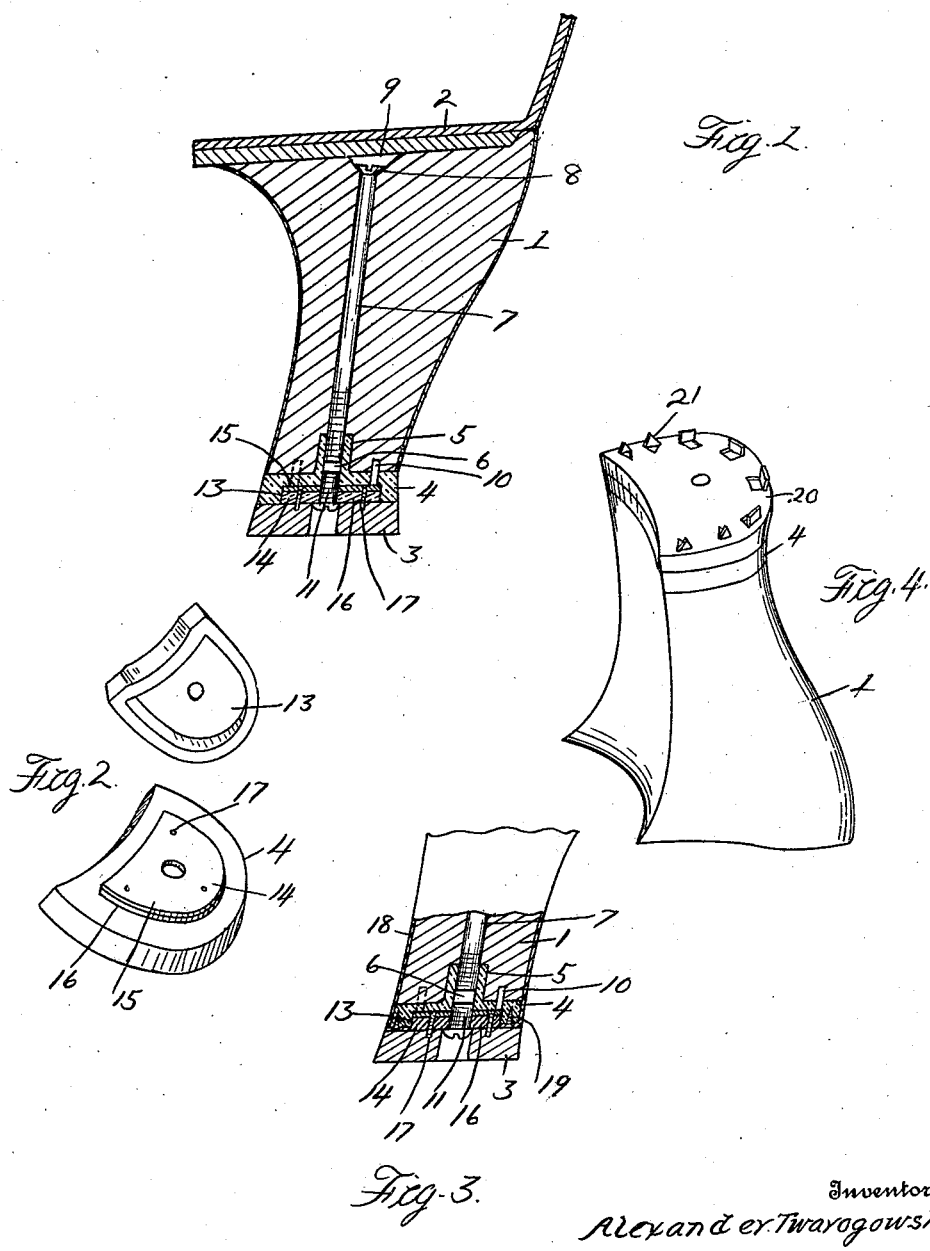

ALEXANDER TWAROGOWSKI, OF DETROIT, MICHIGAN.

HEEL.

1,409,431.                Specification of Letters Patent.        Patented Mar. 14, 1922.

Application filed August 19, 1920. Serial No. 404,566.

*To all whom it may concern:*

Be it known that I, ALEXANDER TWAROGOWSKI, a citizen of the United States of America, residing at Detroit, in the county of Wayne and State of Michigan, have invented certain new and useful Improvements in Heels, of which the following is a specification, reference being had therein to the accompanying drawings.

The invention relates to foot wear and has particular reference to heels. One object of the invention is to provide a construction in which the main body of the heel is retained and to which the tread member is detachably secured by means of an intermediate member. Another object is the provision of an intermediate member having a threaded aperture into which extends the means for securing the intermediate member to the main body, as well as the means for securing the tread member to the intermediate member. Further objects of the invention reside in the means for preventing relative rotation of the parts and in the novel arrangements and combinations of parts as more fully hereinafter set forth.

In the drawings:

Figure 1 is a longitudinal section through a construction embodying my invention;

Figure 2 is a perspective view of the intermediate member and tread member separated;

Figure 3 is a sectional elevation of a modified construction;

Figure 4 is a perspective view of still another modification.

1 is the main body of the heel, preferably formed of wood or the like, and secured to the shoe 2 in the usual manner. 3 is the tread member at the lower end of the heel and preferably formed of a resilient material such as leather or rubber. 4 is a plate, preferably formed of metal, intermediate the tread member 3 and the main body 1 and securing the tread member to the main body.

The plate 4 is detachably secured to the main body 1 and comprises the upwardly-extending boss 5, having the threaded aperture 6 extending therethrough. 7 is a screw extending through the main body 1 and threadedly engaging in the aperture 6, the head 8 of this screw lying within the recess 9 in the upper end of the main body. To prevent rotation of the plate relative to the main body, the pins 10 are provided upon the plate which are adapted to engage in suitable apertures in the lower end of the main body.

For detachably securing the tread member 3 to the plate 4, there is the screw 11 extending through the tread member and threadedly engaging in the aperture. To prevent rotation of the tread member relative to the plate, the plate has the recess 13 in its lower face 6 fitted in by the projecting portion 14 upon the tread. This projecting portion preferably comprises the metallic sheet 15 and the fiber block 16 and the parts are secured together as by means of the nails 17. To firmly secure the tread member to the plate, the head of the screw 11 preferably engages the block 16, thereby reducing the wear and the liability of play between the tread member and plate.

As shown in Figure 3, the general arrangement of parts is substantially the same as disclosed in Figure 1, with the exception that the covering 18 for the main body of the heel overlies the sides of the plate 4 and extends between the plate and the tread member 3, where they may be suitably secured to the plate 4 as by means of the screws 19.

With this construction the tread member 3 formed of resilient material may be readily removed and replaced by the tread member 20, which as shown in Figure 4 is formed of metal and has the struck-out ears or lugs 21, which will prevent slipping.

What I claim as my invention is:

1. In a heel, the combination with the main body, of a plate at the lower end thereof, a single member for securing said plate to said main body, guiding means for preventing relative rotation of said plate and main body, a tread member, a single member in substantial alignment with said first-mentioned single member for detachably securing said tread member to said plate, and guiding means for preventing relative rotation of said tread member and plate.

2. In a heel, the combination with the main body, of a plate at the lower end thereof having a threaded aperture therethrough, a screw engaging in said threaded aperture and main body for securing said plate to said main body, a tread member, and a screw engaging in said threaded aperture and tread member for securing said tread member to said plate.

3. In a heel, the combination with the main body, of a plate at the lower end thereof having a recess in its lower face and a threaded apertured boss, a screw extending through said main body and engaging in the threaded aperture, a pin upon said plate and engaging in said main body, a tread member having a projecting portion fitting within the recess in said plate, and a screw extending through said tread member and engaging in the threaded aperture.

4. In a heel, the combination with the main body, of a plate at the lower end thereof having a threaded aperture therethrough, a screw engaging in said threaded aperture and main body for securing said plate to said main body, guiding means for preventing relative rotation of said plate and main body, a tread member, a screw engaging in said threaded aperture and tread member for securing said tread member to said plate, and guiding means for preventing relative rotation of said tread member and plate.

5. In a heel, the combination with the main body, of a plate at the lower end thereof having a threaded aperture therethrough, a tread member, and means threadedly engaging in said aperture for separately securing said plate to said main body and said tread member to said plate.

In testimony whereof I affix my signature.

ALEXANDER TWAROGOWSKI.